(12) United States Patent
Otsu et al.

(10) Patent No.: US 6,466,693 B1
(45) Date of Patent: Oct. 15, 2002

(54) IMAGE PROCESSING APPARATUS

(75) Inventors: Makoto Otsu, Vancouver, WA (US); Yasushi Adachi; Toshihiro Kanata, both of Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/321,345

(22) Filed: May 27, 1999

(30) Foreign Application Priority Data

May 28, 1998 (JP) .......................................... 10-147440

(51) Int. Cl.$^7$ ................................................ G06K 9/00
(52) U.S. Cl. ........................ 382/176; 382/270; 358/466
(58) Field of Search ................................ 358/452, 453, 358/462, 464, 465, 466; 382/176, 270, 271

(56) References Cited

U.S. PATENT DOCUMENTS

| | | | | | |
|---|---|---|---|---|---|
| 4,996,603 A | * | 2/1991 | Kanemitsu et al. | .......... | 358/462 |
| 5,072,291 A | * | 12/1991 | Sekizawa | ...................... | 358/75 |
| 5,159,471 A | * | 10/1992 | Satou et al. | ................. | 358/466 |
| 5,379,130 A | * | 1/1995 | Wang et al. | .................. | 358/462 |
| 5,608,819 A | * | 3/1997 | Ikeuchi | ........................ | 382/156 |
| 5,661,570 A | * | 8/1997 | Nomura | ........................ | 358/456 |
| 5,787,195 A | * | 7/1998 | Tsujimoto et al. | ........... | 382/176 |
| 5,909,512 A | * | 6/1999 | Ohshima et al. | ............. | 382/251 |
| 5,953,459 A | * | 9/1999 | Ueda et al. | .................. | 382/237 |
| 6,078,405 A | * | 6/2000 | Takeda et al. | ............... | 358/462 |
| 6,268,935 B1 | * | 7/2001 | Kingetsu et al. | ............ | 358/433 |

FOREIGN PATENT DOCUMENTS

| | | |
|---|---|---|
| JP | 5-41796 | 2/1993 |
| JP | 5-167842 | 7/1993 |

\* cited by examiner

*Primary Examiner*—Amelia M. Au
*Assistant Examiner*—Anand Bhatnagar
(74) *Attorney, Agent, or Firm*—Dike, Bronstein, Roberts & Cushman/IP Group Edwards & Angell; David G. Conlin

(57) ABSTRACT

The present invention is an image processing apparatus comprising: dividing means for dividing an image signal obtained by scanning an original document into predetermined local blocks and output a predetermined including a target pixel; a binary coding processing section which converts the image signal in the predetermined block into binary code information; means for calculating each area (dimension) of the binary values; means for calculating number of times that the binary values are changed; a threshold processing section for performing threshold processing by properly and selectively using a threshold of the maximum density difference in the predetermined area, each area (dimension) value after binary coding and number of counts as a parameter; and a judgement processing section for judging the image signal in the predetermined area.

3 Claims, 9 Drawing Sheets

IMAGE PROCESSING APPARATUS

BACKGROUND OF THE INVENTION

(1). Field of the Invention

The present invention relates to an image processing apparatus which serves for digital copying machines and facsimile machines and the like, and performs optimum processing according to the properties of an area obtained by scanning an original document for improving the image quality of recorded images.

(2). Description of the Related Art

With an image processing apparatus such as a digital copying machine and a facsimile apparatus and the like, the image quality has been conventionally improved by discriminating screened half tone, continuous tone and a character area included in an original document, respectively, subjecting the screened halftone area to a smoothing processing to suppress a moiré, and subjecting the character area to an emphasizing processing to display characters clearly. To improve the image quality, various image discrimination methods have been used.

As a representative image discrimination processing method, there is known a method for dividing an image into respective predetermined blocks and discriminating each area by using a characteristic parameter representing properties of character and screened halftone images.

As the related art for discriminating character and screened halftone areas in each predetermined block by using a characteristic parameter, for example, some are disclosed in Japanese Unexamined Patent Publication No. Hei 5-167842 and Japanese Unexamined Patent Publication No. Hei 5-41796.

With the "image processing apparatus" disclosed in Japanese Unexamined Patent Publication No. Hei 5-167842, the image quality is improved by comparing the maximum density difference in a predetermined area including a target pixel with a fixed threshold to judge the area, and changing over the post-stage processing. It utilizes a fact that when a black letter is seen in a local area, the maximum density difference which is a difference between the maximum density and the minimum density is larger than the continuous tone area.

Moreover, the "copying apparatus" disclosed in Japanese Unexamined Patent Publication No. Hei 5-41796 improves the image quality by extracting a non-background color pixel using an average value in an N×N window including a target pixel as a threshold, and judging whether the target pixel is a character area or not by the pattern of the non-background color pixel to change over the post-stage processing. It utilizes a fact that, in the character area, the length of the same value of the data after binary coding becomes long, and designates the maximum density difference, a run length which is the length of the same value of the data and the like as the characteristic information to compare the characteristic information and the fixed threshold, and when the characteristic information is larger sag than the fixed threshold, it is discriminated to be a character area, and in other cases, it is discriminated to be a photograph area and the like.

When a black letter in a predetermined block is a small letter, the density difference may not be detected clearly depending upon the precision of a scanner, and there may be a case where even if it is a character area, the maximum density difference becomes small. Therefore, with the threshold processing method using a fixed threshold, erroneous separation may be caused, which becomes a significant problem.

Furthermore, when an area in which a character is included is binarized and used as a run length to designate the maximum continuous value of the binary coding result as a characteristic value, in general, binary coding is performed by using an average value in a predetermined area. However, due to the average value determined in a local area, even where the density change is small, there is a possibility of being divided into erroneous binary values by the binary coding processing, which has been a problem.

SUMMARY OF THE INVENTION

In view of the foregoing problem, it is an object of the present invention to provide an image processing apparatus which discriminates in which area of the character area, the continuous tone area and the screened halftone area each pixel belongs, with respect to an image signal obtained by two-dimensionally scanning an original document in the main scanning direction and in the sub-scanning direction, and performs a processing for improving the image quality to enhance the detection accuracy of, in particular, black letters.

With a view to attaining the above objects, the gist of the present invention is as follows.

The first gist of the present invention is an image processing apparatus which discriminates an area having different properties with respect to an image signal obtained by scanning an original document, and performs adequate processing to each area, wherein said image processing apparatus comprises:

dividing means for dividing the image signal into local blocks having a predetermined size; and local characteristic value-computing means having:

a binary coding processing section which converts an image signal in a predetermined block including a target pixel into binary code information, from image signals output from the dividing means in an area to be processed;

a threshold processing section which processes characteristic information in the predetermined block with a threshold determined by selectively using each area (dimension) value of binary values from the binary code information output from the binary coding processing section and number of times that the binary code information is changed; and a judgement processing section which judges whether the target pixel in the predetermined block is a character area or not based on the processing result of the threshold processing section.

The second gist of the present invention is an image processing apparatus which discriminates an area having different properties with respect to an image signal obtained by scanning an original document, and performs adequate processing to each area, wherein said image processing apparatus comprises:

dividing means for dividing the image signal into local blocks having a predetermined size; and local characteristic value-computing means having:

an edge detection section for detecting an edge in a local block including a target pixel in the local block output from the dividing means;

a binary coding processing section which converts an image signal in a predetermined block including a target pixel into binary code information, from image signals output from the dividing means in an area to be processed; a threshold processing section which processes characteristic information in the predetermined block with a threshold determined by selectively using each area (dimension) value of binary values from the binary code information output from the binary coding processing section and number of times that the binary code information changed; and a judgement processing section which judges whether the target pixel is a character area or not based on the processing result of the threshold processing section; and a color judgement processing section for judging whether the target pixel which is an edge is a monochrome edge or a color edge, based on the edge detection results of the edge detection section.

The third gist of the present invention is an image processing apparatus which discriminates an area having different properties with respect to an image signal obtained by scanning an original document, and performs adequate processing to each area, wherein said image processing apparatus comprises:

dividing means for dividing the image signal into local blocks having a predetermined size; and local characteristic value-computing means having:

an edge detection section for detecting an edge in a predetermined block including a target pixel in the predetermined block output from the dividing means;

a binary coding processing section which converts an image signal in a predetermined block including a target pixel into binary code information, from image signals output from the dividing means in an area to be processed; a threshold processing section which processes characteristic information in the predetermined block with a threshold determined by selectively using each area (dimension) value of binary values from the binary code information output from the binary coding processing section and number of times that the binary code information is changed; and a judgement processing section which judges whether the target pixel is a character area or not based on the processing result of the threshold processing section; and an edge arrangement judging section for judging the edge arrangement in the predetermined block including the target pixel, based on the edge detection result of the edge detection section.

The processing of the image processing apparatus according to the first gist is such that the image signal obtained by scanning the original document is divided into local blocks having a predetermined size by the dividing means, and the image signal in a predetermined block including a target pixel from the image signals in the divided block to be processed is transmitted to a local characteristic value-computing means.

The image signal transmitted to the local characteristic value-computing means is converted into binary code information by the binary coding processing section, and each area value of binary values and number of times that the binary code information is changed are calculated, a threshold of the characteristic information is determined by properly and selectively using each area value and the change count, and in the threshold processing section, the characteristic information in the predetermined block is processed based on the threshold.

Then, based on the threshold processing results of the characteristic information in the predetermined block, the judgement processing section judges whether the image signal of the target pixel in the predetermined block is character information or not.

When the image signal in the predetermined block is discriminated to be a character area by the above described local characteristic value-computing means, a proper processing such as an emphasizing processing and the like is performed for the character area.

Therefore, according to the construction of the first gist, when edges of, for example, black letters are detected by processing the characteristic information in the predetermined block used at the time of detection of black letters and the like with the threshold, it becomes possible to maintain the detection accuracy not only for large letters but also for small letters, which are generally considered to be difficult to be detected, not by using a fixed threshold as a threshold for the threshold processing, but by properly changing over the threshold according to the area of the predetermined area after binary coding and the number of times that the binary values are changed.

In particular, by utilizing a fact that small letters and fine letters have an area (dimension) different from that of large letters in a predetermined block, a binary area after binary coding is used for changing over the threshold. When the area is small, the threshold of the characteristic information is set to be wide, enabling to correspond to small letters and fine letters, thereby the detection accuracy of small letters and fine letters can be increased compared to the detection accuracy when using a fixed threshold of the characteristic information.

Moreover, when, for example, a small letter is close to other letters, it may be judged as a wide area. In that case, however, since the number of times that the binary values are changed is larger than a predetermined number of times, by including such a change count in a parameter for determining the threshold of the characteristic information, letters can be properly detected even if small letters are formed densely.

The processing of the image processing apparatus according to the second gist is such that the image signal obtained by scanning the original document is divided into predetermined local blocks by the dividing means, and the divided image signal is transmitted to a local characteristic value-computing means.

The image signal transmitted to the local characteristic value-computing means is transmitted to an edge detection section and a binary coding processing section.

With respect to the image signal transmitted to the edge detection section, edges in a predetermined block are detected.

The image signal transmitted to the binary coding processing section is converted into binary code information, and each area value of binary values and the number of times that the binary code information is changed are calculated, and a threshold of the characteristic information is determined by selectively using each area value and the change count, and based on the threshold, the threshold processing of the characteristic information in the predetermined block is performed in the threshold processing section. Then, from the threshold processing result of the characteristic information in the predetermined block, it is judged whether the target pixel in the predetermined block is a character area or not by the judgement processing section.

Moreover, the edge in the predetermined block detected by the edge detection section is subjected to color judgement by the color judgement processing section, and it is judged whether the target pixel which is an edge is a monochrome edge or a color edge.

Then, from the results of judgement of the character edge by the judgement processing section and color judgement of the edge by the color judgement processing section, proper processing is performed for each area.

According to the construction of the second gist, therefore, by properly changing over the threshold used for the threshold processing of the characteristic information, depending upon the area after binary coding of the predetermined block and the number of times that the binary values are changed, sufficient detection accuracy can be maintained not only for large letters but also for small letters which are generally considered to be difficult to be detected, as well as differentiation between monochrome letters and color letters becomes possible. Hence, emphasizing processing suitable for the monochrome letters and color letters can be performed properly, thereby an image processing apparatus which can produce a high quality image can be provided.

The processing of the image processing apparatus according to the third gist is such that the image signal obtained by scanning the original document is divided into predetermined local blocks by the dividing means, and the divided image signal including a target pixel in a predetermined area is transmitted to a local characteristic value-computing means.

The image signal transmitted to the local characteristic value-computing means is transmitted to an edge detection section and a binary coding processing section.

With respect to the image signal transmitted to the edge detection section, edges in a predetermined block are detected.

The image signal transmitted to the binary coding processing section is converted into binary code information, and each area value of binary values and the number of times that the binary code information is changed are calculated, and a threshold of the characteristic information is determined by selectively using each area value and the change count, and based on the threshold, the threshold processing of the characteristic information in the predetermined block is performed in the threshold processing section. Then, from the threshold processing result of the characteristic information in the predetermined block, it is judged whether the target pixel in the predetermined block is a character area or not by the judgement processing section.

Moreover, the detected result by the edge detection section, it is judged whether it is an arrangement of the character edge or not by the edge arrangement judging section.

Then, from the results of judgement of the character edge by the judgement processing section and judgement of the edge arrangement by the edge arrangement judging section, proper processing is performed for each area.

According to the construction of the third gist, therefore, by properly changing over the threshold used for the threshold processing of the characteristic information, depending upon the area after binary coding of the predetermined area and the number of times that the binary values are changed, sufficient detection accuracy can be maintained not only for large letters but also for small letters which are generally considered to be difficult to be detected, as well as the character edge can be discriminated based on the edge arrangement. Hence, the character edge can be reliably discriminated.

Since characters can be emphasized in the area where it is judged to be a character area, an image processing apparatus which can produce clear and vivid black letters can be provided.

DESCRIPTION OF THE PREFERRED EMBODIMENTS

Figure 1:
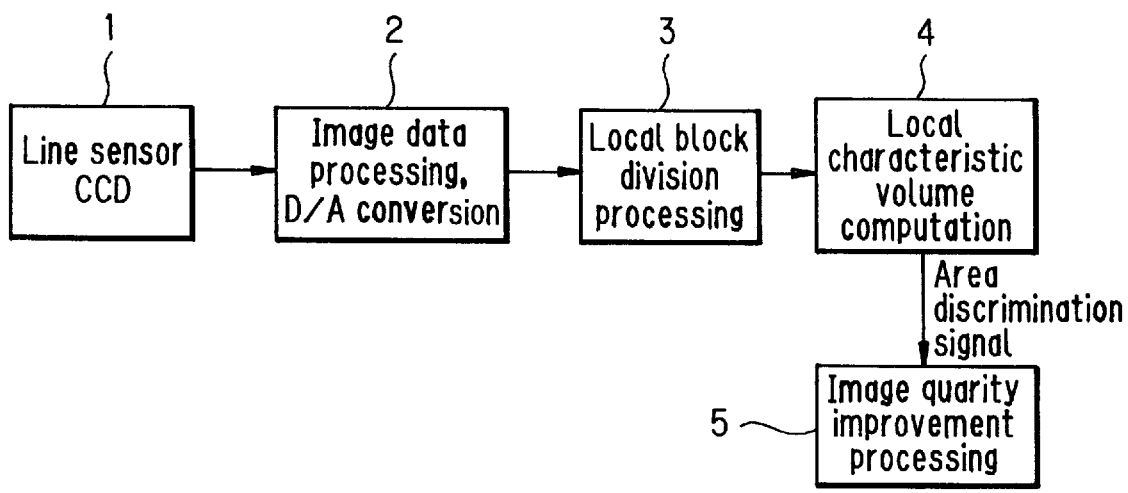
FIG. 1 is a block diagram explaining an image processing apparatus according to an embodiment of the present invention.

The image processing apparatus according to the embodiment of the present invention comprises a storage means (local block dividing means) which A/D-converts an original data read by a digital copying machine and the like with an image data processing apparatus and stores the image data of an area composed of a target pixel and a plurality of pixels in the vicinity thereof (hereinafter referred to as "a local block"), designating a pixel selected one by one from the image signals as a target pixel; a local characteristic value-computing means for judging whether the image data in a local area stored in the storage means is a character area, or a screened halftone area, based on the local characteristic value for every target pixel to output a signal according to the type of the area; and a processing means for improving the image quality which performs an emphasizing processing of character signals predetermined based on the output signal from the local characteristic value-computing means, or smoothing processing and the like of screened halftone signals.

According to the image processing apparatus according to the embodiment of the present invention, the image data of an original document in which character areas, continuous tone areas and screened halftone areas exist is first divided into predetermined local blocks, then transmitted to the local characteristic value-computing means for discriminating the area types.

With the local characteristic value-computing means, a plurality of local characteristic volumes are determined for judging whether the image data in the local block stored in the storage means is a character area, a continuous tone area or a screened halftone area, and based on the local characteristic volume for each target pixel, the type of the area in which the target pixel in the local block belongs is discriminated.

The method for discriminating whether the image data is a character area, a continuous tone area or a screened halftone area by the local characteristic value-computing means is performed such that when the maximum density difference, maximum density and minimum density are used as the characteristic information, the maximum density difference and the like of the image data in the local area are compared with the respective thresholds and thereby the image data can be identified as a particular area in the character, continuous tone and screened halftone areas, based on whether the density parameters are higher or lower than the respective thresholds. At the time of discrimination, a fixed threshold has been conventionally used, but in the embodiment of the present invention, a variable threshold is used for the area judgement using the characteristic information, which is the characteristic of the embodiment of the present invention.

The reason why the thresholds of the maximum density difference, maximum density and minimum density described above are changed over is that by changing over the threshold of a large letter and the threshold of a small letter, for example, the character detection accuracy can be improved.

That is to say, since the character area has generally a larger maximum density difference than the continuous tone area, if seen in the local area, it is possible to discriminate the character area and the continuous tone area by performing the threshold processing. However, as a letter becomes small, it becomes difficult to read the letter with a sufficient density difference due to the influence of the precision of an original reading apparatus such as a scanner and the like. If the threshold processing is performed with a fixed threshold, it is difficult to differentiate small letters not having sufficient density from the continuous tone area or the screened halftone area, which leads to erroneous separation.

Therefore, by changing over the threshold of the maximum density difference and the like by using a predetermined parameter, it is possible to eliminate erroneous detection.

The discrimination method by means of a variable threshold will now be described.

The changeover of the threshold of the maximum density difference, the maximum density and the minimum density in the local block is performed by binarizing a predetermined block and using two parameters of each area value of binary values expressed by "0" and "1" and the number of times that the binary values are changed.

As the above described binary coding processing means, for example, the average density in the local block and the density of each pixel are compared, and when the density of the pixel is smaller than that of the average pixel, it is judged that the background area is "0", and when the density of the pixel is larger than that of the average pixel, it is judged that the background area is "1", to perform the binary coding processing.

By using the area (dimension) value of each area in the local block which has been subjected to the binary coding processing as a first parameter for changing over the threshold of the maximum density difference and the like, for example, the area (dimension) of the non-background area (having a darker density after binary coding) of a small letter or a fine letter becomes small compared to that of a large letter or the continuous tone area. Therefore, when the non-background area is small, the threshold is changed over so that the threshold of the maximum density difference is lowered, so that the threshold processing can be performed with a threshold suitable also for small letters.

Moreover, the reason why the change count is used as a second parameter for changeover of the threshold of the maximum density difference and the like is that there may be a case where the area of the non-background area is large in spite of a small letter (when the small letter adjoins an edge of something, etc.), and in that case, the non-background area and the background area exist alternately, and the number of times that the non-background area and the background area are changed becomes large. Hence, when the change count is large, the threshold for the threshold processing is also lowered to increase the discrimination accuracy of small letters, fine lines and the like.

Furthermore, with the above described local characteristic value-computing means, color judgement is also performed based on the existence of an edge in the same place in the local area of each plane of RGB. In the case of a black letter, since an edge is shared by each plane of RGB, the place (pixel) where the edge exists in common in each plane of RGB (pixel) is counted, and when the count number is larger than a predetermined threshold, it is discriminated to be an edge of a black letter, and when the count number is smaller than the predetermined threshold, it is discriminated to be an edge of a color letter.

Furthermore, with the local characteristic value-computing means, matching between an edge pattern based on the edge arrangement in the local area and an edge pattern of a pre-supposed character is judged, and when the matching value is larger than a predetermined threshold value, it is judged to be a character edge, and when the matching value is smaller than the predetermined threshold value, it is judged to be an edge of a continuous tone or the like.

With the above described local characteristic value-computing means, the character area in a predetermined local area can be accurately discriminated as a character edge, by performing a variable threshold processing of the characteristic information in the predetermined local block, a processing for judging the existence of an edge in the same place in the local block of each plane of RGB, and an edge pattern judgement processing based on the edge arrangement.

Since the character area (in particular, a black letter in the original image) can be accurately discriminated as a character edge, a black letter can be reliably subjected to an emphasizing processing. Hence, characters can be clearly displayed, and an image processing apparatus which can improve the image quality can be provided.

Furthermore, since the edge of a black letter and the edge of a color letter can be differentiated, only the black letter can be subjected to the emphasizing processing. Since the color letter portion is not subjected to the emphasizing processing, the hue of the color letter portion is not changed, thus an image processing apparatus which can further improve the image quality can be provided.

An embodiment of the present invention will now be described in detail, with reference to the accompanying drawings.

FIG. 1 is a block diagram showing a schematic electrical construction of an image processing apparatus according to the embodiment of the present invention.

The image processing apparatus according to the embodiment of the present invention in FIG. 1, has a line sensor 1 which captures the image of an original as the subject of process, and generates image data; image data processing means 2 for subjecting the image data transferred from the line sensor 1 to an electric processing including analog/digital conversion; local block division processing means 3; local characteristic value-computing means 4 which operates according to a pre-set program or an electric circuit corresponding thereto, performs arithmetic processing of the digitized local block image data from the local block division processing means 3, and performs an area discrimination processing; and an image quality improvement processing 5 in the post-stage for inputting a result of discrimination by the arithmetic means 4 as an area discrimination signal and improving the image quality based on this signal.

As the line sensor 1, a CCD (Charge Coupled Device) has been generally used. Since an image signal read from an original document by this solid-state image sensing device is an analog value, the image signal is subjected to the analog/digital (A/D) conversion by the image data processing means 2. Therefore, the image signal coming through the image data processing means 2 is handled as a digital signal.

Figure 2:
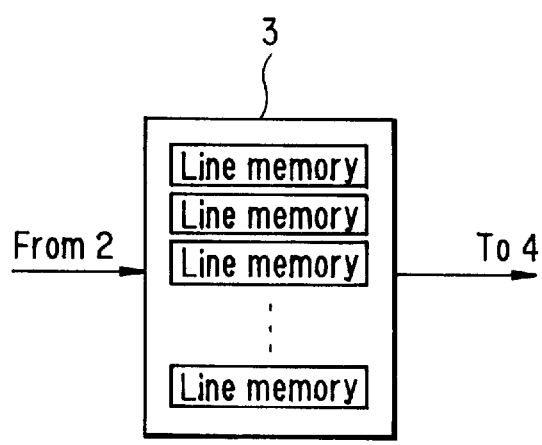
FIG. 2 is a block diagram of a local block division processing 3 shown in FIG. 1.

The local block division processing means 3 is provided with a plurality of line memories, and sequentially inputs an image signal taken in by the CCD 1 as a signal for one line, to sequentially accumulate the image signal in a plurality of line memories (see FIG. 2)

Since the local block division processing means 3 is provided with a plurality of line memories, it becomes possible to obtain a necessary local block image signal by the local characteristic volume computation 4. For example, when a local block is assigned to be N×N (N lines, N rows) pixels, at least line memories for N lines are mounted thereon.

The local characteristic value-computing means 4 is to obtain an area discrimination signal showing that each pixel of the local block image signal transmitted from the local block division processing means 3 is a character area, a continuous tone area or a screened halftone area, and the details thereof will be described later.

The image quality improvement processing 5 is supplied with an area discrimination signal from the local characteristic value-computing means 4, and for example, if a character signal is obtained, an emphasizing processing is performed, and if a screened halftone signal is obtained, a smoothing processing is performed. Hence, a processing suitable for the area can be performed.

The construction and operation of the local characteristic value-computing means 4 will now be described with reference to FIG. 3.

The local characteristic value-computing means 4 mainly performs the processing for discriminating whether the image signal transmitted from the local block division processing means 3 is a black letter or not, and is mainly composed of four parts: that is, an edge correction processing block 8 for eliminating an edge not suitable for characters, an edge detection section 17, a color judgement processing block 9 for judging whether the edge is an edge of a black letter or an edge of a color letter, and an edge pattern detection processing block 10 for judging whether the edge is a character edge or not depending upon the edge arrangement in the block.

The edge correction processing block 8 is a processing block for detecting a character edge, excluding a continuous tone edge from edges obtained by the normally used edge detection processing, and comprises a binary coding processing section 11, an area calculation section 12, a change count calculating section 13, a threshold setting section 11A, and a maximum density difference calculating section 14, a maximum density calculating section 15 and a minimum density calculating section 16.

In general, a character edge has such characteristics that it has larger maximum density difference in the local block, larger maximum density when letters exist on a white paper, and smaller minimum density when white letters exist on a black paper, compared to a continuous tone edge. Presupposing such characteristics, letters existing on an original paper having a certain density are not detected. This is because if a letter on a base having a density is emphasized, the periphery of the letter is blanked to decrease the image quality.

The binary coding processing 11 is to divide the image signal in the block into a non-background area (if expressed by binary values of "1" and "0", it is "1") and a background area (if expressed by binary values of "1" and "0", it is Based on the division information, the area of each non-background area and the background area is calculated in the area calculation processing section 12, and the number of times that the non-background area and the background area are changed is calculated in the change count calculation processing section 13. The details thereof will be described later.

The threshold setting section 11A performs processing for setting each threshold for the maximum density difference, maximum density and minimum density used as parameters for judging edges of a character described below, based on the area and the change count obtained by the area calculation processing 12 and the change count calculation processing 13.

The maximum density difference, maximum density and minimum density in the local block are calculated by the maximum density difference calculating section 14, the maximum density calculating section 15 and the minimum density calculating section 16, respectively, and are subjected to judgement by means of respective threshold processing sections 20, 21 and 22, based on the respective thresholds set by the threshold setting section 11A.

With the judgement processing 23, when all conditions of the maximum density difference, the maximum density and the minimum density described later are satisfied in respective threshold processing sections 20, 21 and 22, a target pixel in a predetermined block is judged to be a character area.

The processing in the edge correction processing block 8 described above will now be described in detail.

Figure 4:
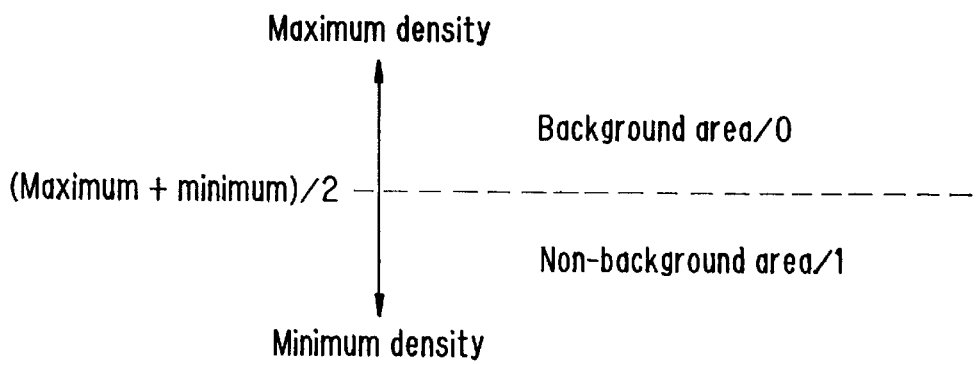
FIG. 4 is a diagram for explaining the binary coding processing by a binary coding processing section 11 in FIG. 3.

The processing of the binary coding processing section 11 is to perform binary coding, using a mean value between the maximum density value and the minimum density value in a local block as a threshold, as shown in FIG. 4.

For example, assuming that the maximum density value is max and the minimum density value is min, when I (x, y)≦(max+min)/2, it is a non-background area (1), and when I (x, y)>(max+min)/2, it is a background area (0). However, since the terms, "non-background area" and "background area", are used on the assumption that these terms are concerned with characters on a white paper, the density of character is assumed to be less than (max+min)/2, and these terms do not actually indicate character area and the other areas.

The processing of the area calculating section 12 is to count the number of each non-background area (1) and background area (0) from the binary code information obtained by the binary coding processing section 11. For example, in a block 30 of 7×7 (7 lines, 7 rows) pixel shown in FIG. 5, the area of the non-background area (1), area 1=17 pixels, and the area of the background area (0), area 0=32 pixels. These values are designated as each area (dimension).

Figure 5:
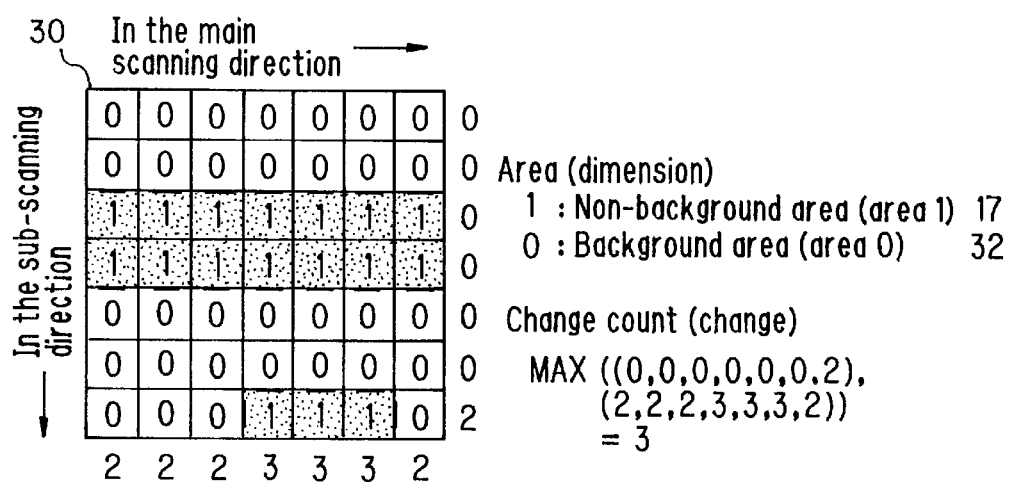
FIG. 5 is a diagram for explaining processing in an area processing section 12 and an change processing section 13 in FIG. 3.

The processing of the change count calculating section 13 is to count the number of boundaries between the non-background area (1) and the background area (0) in the main scanning direction and in the sub-scanning direction of the local block. In the case of FIG. 5, for example, the change count in the main scanning direction and in the sub-scanning direction are shown at the right side of the block 30 and under the block 30, respectively. Among them, the largest count is designated as the characteristic volume of the change count, and in the case of FIG. 5, the change count becomes three.

Figure 6:
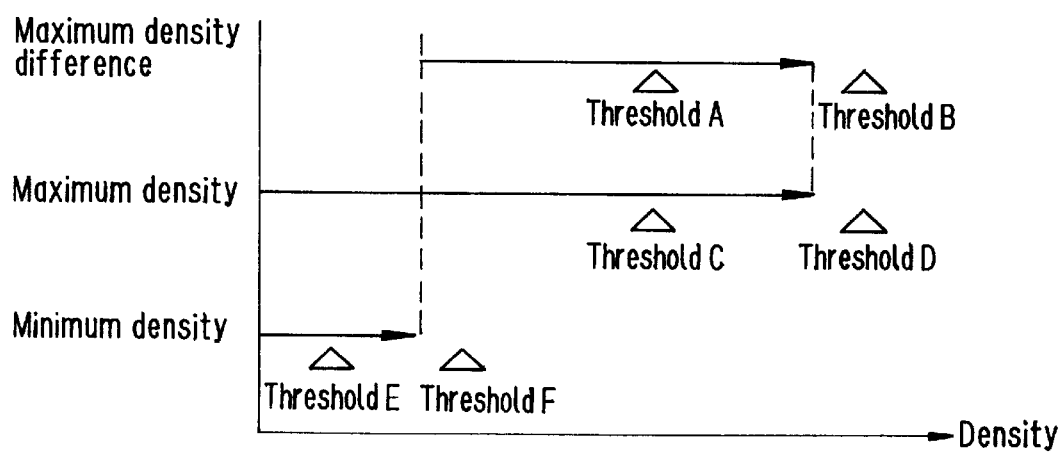
FIG. 6 is a diagram for explaining processing of threshold processing sections 20, 21 and 22 in FIG. 3.

FIG. 6 shows an example of setting a threshold for the maximum density difference, the maximum density and the minimum density in a local block by the threshold setting section 11A.

As a threshold for the maximum density difference (maximum density value—minimum density value), for example, when threshold A and threshold B are set, the threshold is selected as described below, using the above described two parameters:

in the case of area 1/change≦threshold DI, select the threshold A, and in the case of area 1/change<threshold DI, select the threshold B.

As described above, by properly changing the threshold for the character judgement using the maximum density difference, when the change count is large and the area (dimension) of the non-background area is small, as in the case of a small letter, a loose (low) threshold A is selected. On the contrary, when a letter is large, a strict (high) threshold B is selected. Therefore, even if it is a small letter, it can be appropriately detected as a character. In addition, the threshold DI is empirically set in advance.

The maximum density value is a parameter used for determining the maximum density difference. When threshold C and threshold D are set as the threshold for judging whether an area has the maximum density or not when a character is required to be judged by the maximum density difference, the threshold is selected according to the following selection conditions:

in the case of area 0≧threshold MA, select the threshold C, and in the case of area 0<threshold MA, select the threshold D.

When the area (dimension) of the background area (area 0) is smaller than the predetermined threshold MA, since there is enough area for detecting the maximum density value, the strict threshold D is selected. When the area (dimension) of the background area (area 0) is equal to or larger than the predetermined threshold MA, the loose threshold C is selected, considering a case where the density of small letters, fine letters and the like may not be detected sufficiently. In addition, the predetermined threshold MA is empirically set in advance.

In the above conditional equation, the selection of the threshold is determined based on the area (dimension) of the background area (area 0), but it may be determined by the area (dimension) of the non-background area (area 1). In that case, when the area (dimension) of the non-background area (area 1) is larger than the threshold MA, since there is enough area for detecting the maximum density value, the strict threshold D is selected.

Likewise, the minimum density value is a parameter used for determining the maximum density difference. When threshold E and threshold F are set as the threshold for judging whether an area has the minimum density or not when a character is required to be judged by the maximum density difference, the threshold is selected according to the following selection conditions:

in the case of area 1≦threshold MI, select the threshold E, and in the case of area 1>threshold MI, select the threshold F.

When the dimension of the non-background area (area 1) is equal to or smaller than the predetermined threshold MI, the dimension is enough for detecting the minimum density, even if it is a character area. Therefore, the strict threshold E is selected. On the contrary, when the dimension of the non-background area (area 1) is larger than a predetermined threshold MI, the dimension is not enough for the detection of the minimum density, even if it is a character area. Therefore, the loose threshold F is selected. The threshold MI is empirically set in advance.

In addition, in the above described example, selection of the threshold for the minimum density value is performed using the dimension of the non-background area, but the dimension of the background area (area 0) may be used. In that case, when the dimension of the background area (area 0) is larger than the threshold MI, since there is enough dimension for detecting the minimum density value, the strict threshold E is selected.

Figure 3:
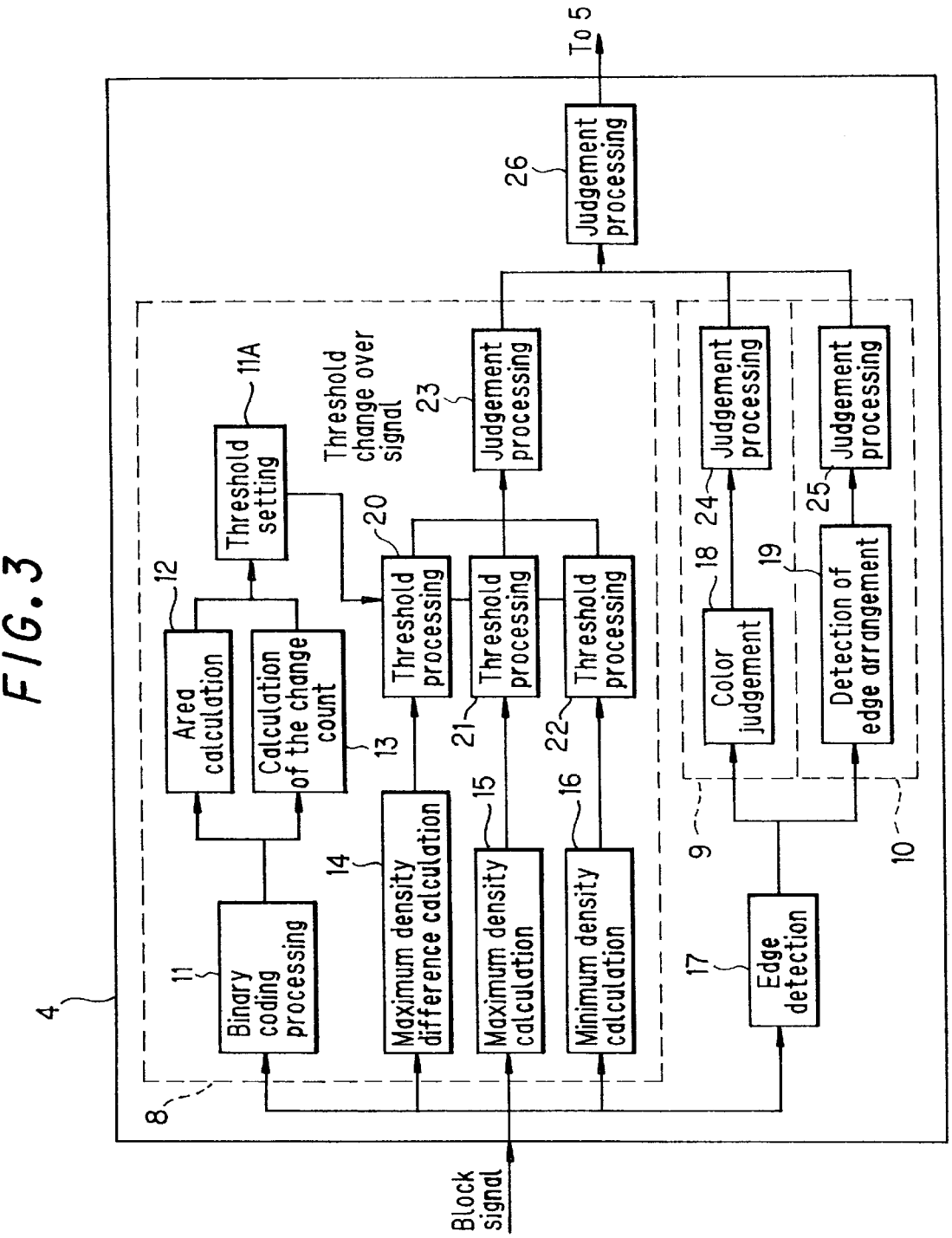
FIG. 3 is a block diagram of a local characteristic volume computation 4 in FIG. 1.

The edge detection section 17 shown in FIG. 3 is a section for detecting an edge in a local block including a target pixel of an image signal transmitted from the local block division processing means 3.

Figure 7:
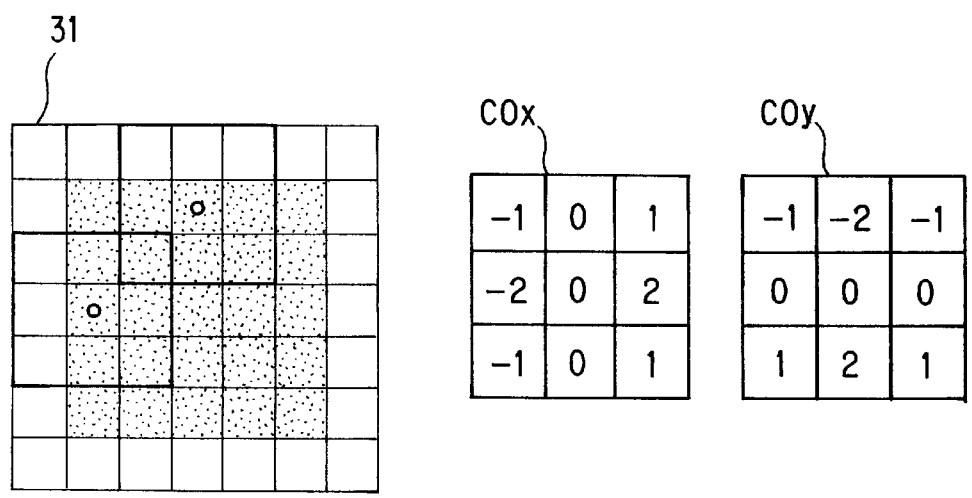
FIG. 7 is a diagram for explaining the processing of an edge detection section 17 in FIG. 3.

The means for detecting an edge from the image signal divided by the local block division processing means 3 can detect an edge of 6×6 pixels excluding the outside one line, by the convolution of a Sobel filter (COX and COY) 32 onto a block 31, when the image signal is divided into 7×7 pixels, for example, as shown in FIG. 7.

If it is assumed that the pixel value in the 7×7 pixel block in FIG. 7 to be I(x, y), the edge(x, y) showing the presence of an edge in (x, y) will be:

edge(x, y)=presence of an edge, in the case of $$\sqrt{val_{x}^2 + val_{y}^2} \geq \text{threshold EG}$$

edge(x, y)=absence of an edge, in the case of $$\sqrt{val_{x}^2 + val_{y}^2} < \text{threshold EG},$$

by using valx=ΣCOx×I(x, y), and valy=ΣCOy×I(x, y).

Provided that the threshold EG is preset according to the precision of a scanner and the separation accuracy. This method is referred to as "Sobel edge detection method", but the present invention is not limited to this detection method.

In FIG. 3, a color judgement processing block 9 encircled by a broken line has a color judgement processing section 18 and a judgement processing section 24. Based on the edge detection result by the edge detection section 17, the number where an edge exists in common in the same block in each plane of RGB in the local area 31 (FIG. 7) is counted, and based on the count, color judgement is performed.

For example, since an edge of a black letter exists in all planes of R (red), G (green) and B (blue) (black has all components of R, G and B), if the above count is designated as a characteristic volume, in the case of a black letter, the characteristic volume becomes large, and in the case of a color letter, the characteristic volume becomes small. Hence, discrimination between a black letter and a color letter becomes possible.

The color judgement processing section 18 and the judgement processing section 24 constituting the color judgement processing block 9 will now be described.

The color judgement processing section 18 counts the number where an edge exists in the same place with respect to an edge of each plane of RGB obtained from the edge detection section 17 of Local block 31. When the count (Paracolor) is a predetermined threshold RGB or lower, the edge is judged to be an edge of a color letter, and when the count is a predetermined threshold RGB or higher, the edge is judged to be an edge of a black letter.

In addition, the threshold RGB is empirically set in advance (considering the precision of a scanner and the like).

Figure 8:
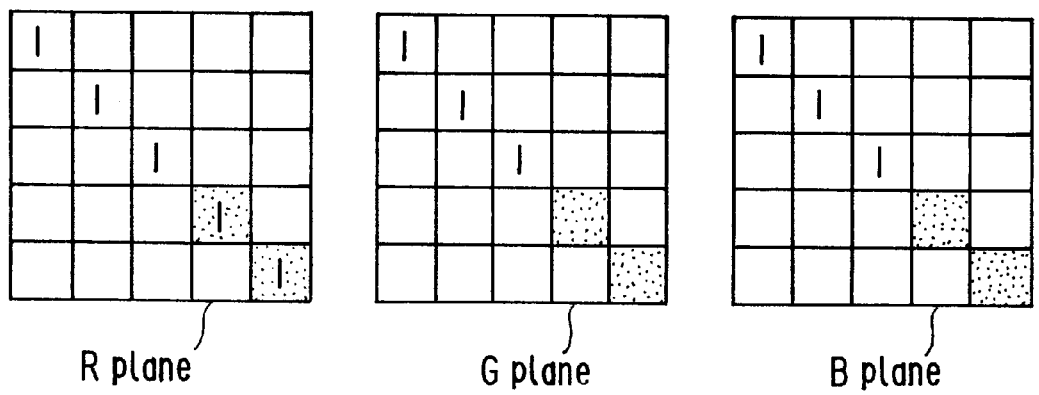
FIG. 8 is a diagram for explaining the processing of a color judgement processing block 9 in FIG. 3.

For example, as shown in FIG. 8, when an edge exists for each plane in a local block, in a black square portion, an edge exists for the R plane, but does not exist in other G and B planes, hence it is not counted. In three pixels continuous in the left, obliquely upward direction, edges exist in common in RGB planes, therefore, in such local blocks, Paracolor is three (Paracolor=3).

Then, the color of the edge (Color) is judged by comparing a value of the Paracolor with a predetermined threshold RGB in the judgement processing section 24, using a judgement equation described below:

in the case of Paracolor≦threshold RGB, Color=color letter edge, in the case of Paracolor<threshold RGB, Color=black letter edge.

The edge pattern detection processing block 10 encircled by a broken line in FIG. 3 is composed of an edge arrangement detection section 19 and a judgement processing section 25.

Generally, when a character is discriminated by the arrangement of an edge, a local block is binarized, and the binary coding information is used for the discrimination. With such a conventional method, however, even in a place where the density changes gently, such as a continuous tone area, the block is binarized, and erroneous discrimination will occur depending upon the arrangement.

Therefore, in an embodiment of the present invention, the edge pattern detection processing block 10 is provided to determine the arrangement of edges, so that the place where the density changes gently (where the brightness hardly changes) is not detected as an edge. Thus, character judgement from the binary coding processing information (for example, an edge correction processing block 8) is complemented to prevent erroneous discrimination.

The edge arrangement detection section 19 is a section for discriminating whether an edge obtained by the edge detection means 17 is a character edge or not, using the arrangement pattern of the edge obtained by the edge detection means 17 and a pre-prepared character edge arrangement pattern.

The above described character edge discrimination method is to detect a pattern by assuming that, for example, in the case of a character, edges exist in horizontal, vertical and oblique directions, and judge the edge pattern in the judgement processing section 25.

The processing in the edge pattern detection processing block 10 will now be specifically described.

Figure 9:
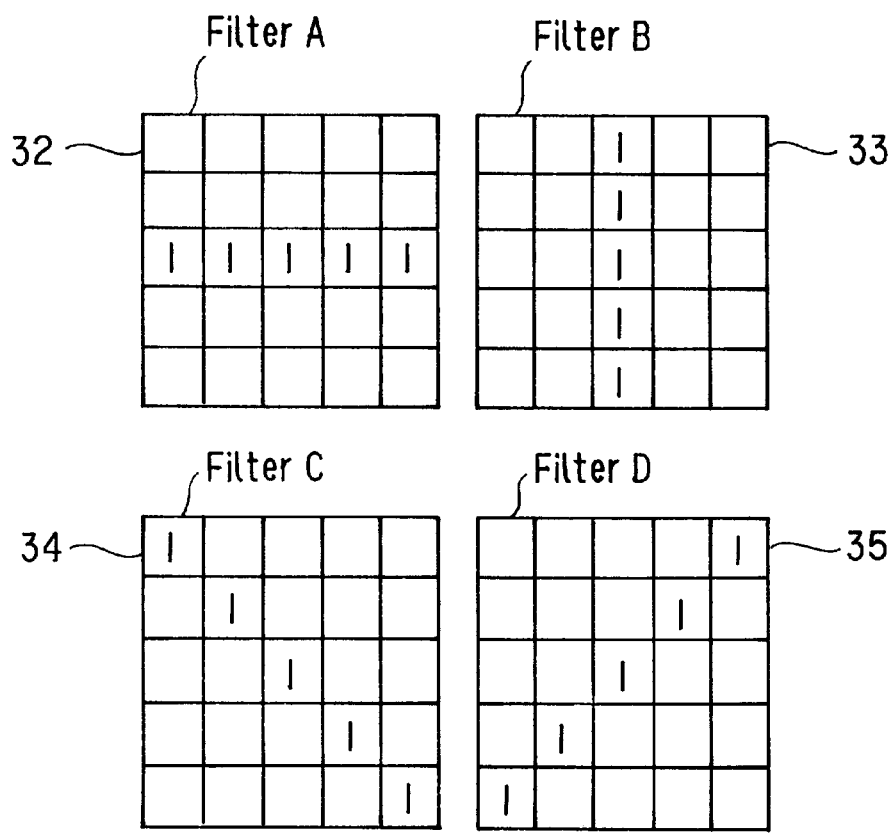
FIG. 9 is a diagram for explaining the processing of an edge arrangement detection section 19 in FIG. 3.

For example, when a filter A32, a filter B33, a filter C34 and a filter D35 (hereinafter referred to as "filters" collectively) are prepared as a character edge arrangement pattern, as shown in FIG. 9, it is detected whether there is an edge arrangement showing characteristics of a character edge by filtering an edge obtained by the edge detection section 17. In the filters in FIG. 9, places other than 1 are designated as 0. The processing equation will now be described.

The equation used in the edge arrangement detection section 19 is for calculating a parameter, patternA for the detection of the edge arrangement, using:

patternA=a filter A×edge.

Similarly, with respect to filters B to D, each parameter (patternB, patternC, and patternD) is calculated.

With the judgement processing section 25, based on the parameter calculated in the edge arrangement detection section 19, when max (patternA, patternB, patternC, patternD)≧threshold EG, it is judged that the edge arrangement is the character array, and when max (patternA, patternB, patternC, patternD)<threshold EG, it is judged that the edge arrangement is an arrangement other than the character array. However, the threshold EG is set in advance depending upon the separation accuracy, and if the threshold EG is made strict (high), only the array shown by the edge pattern will be judged to be a character string, but if the threshold EG is made loose, a range somewhat off the array will be judged to be a character array.

In addition, the above described max (patternA, patternB, patternC, patternD) shows the maximum value among patternA to patternD.

The judgement processing section 26 is to comprehensively discriminate whether an edge is the edge of a black letter or not, based on the judgement results in the above described edge correction processing block 8, the color judgement processing block 9, and the edge pattern processing block 10. In the judgement processing section 26, when the judgement conditions of each block 8, 9 and 10 are satisfied, an edge is judged to be an edge of a black letter, and a discrimination signal is output to a image quality improvement processing section 5.

The processing operation of the image processing apparatus according to the embodiment of the present invention described above will now be described, based on flow charts shown in FIG. 10 to FIG. 13.

Figure 10:
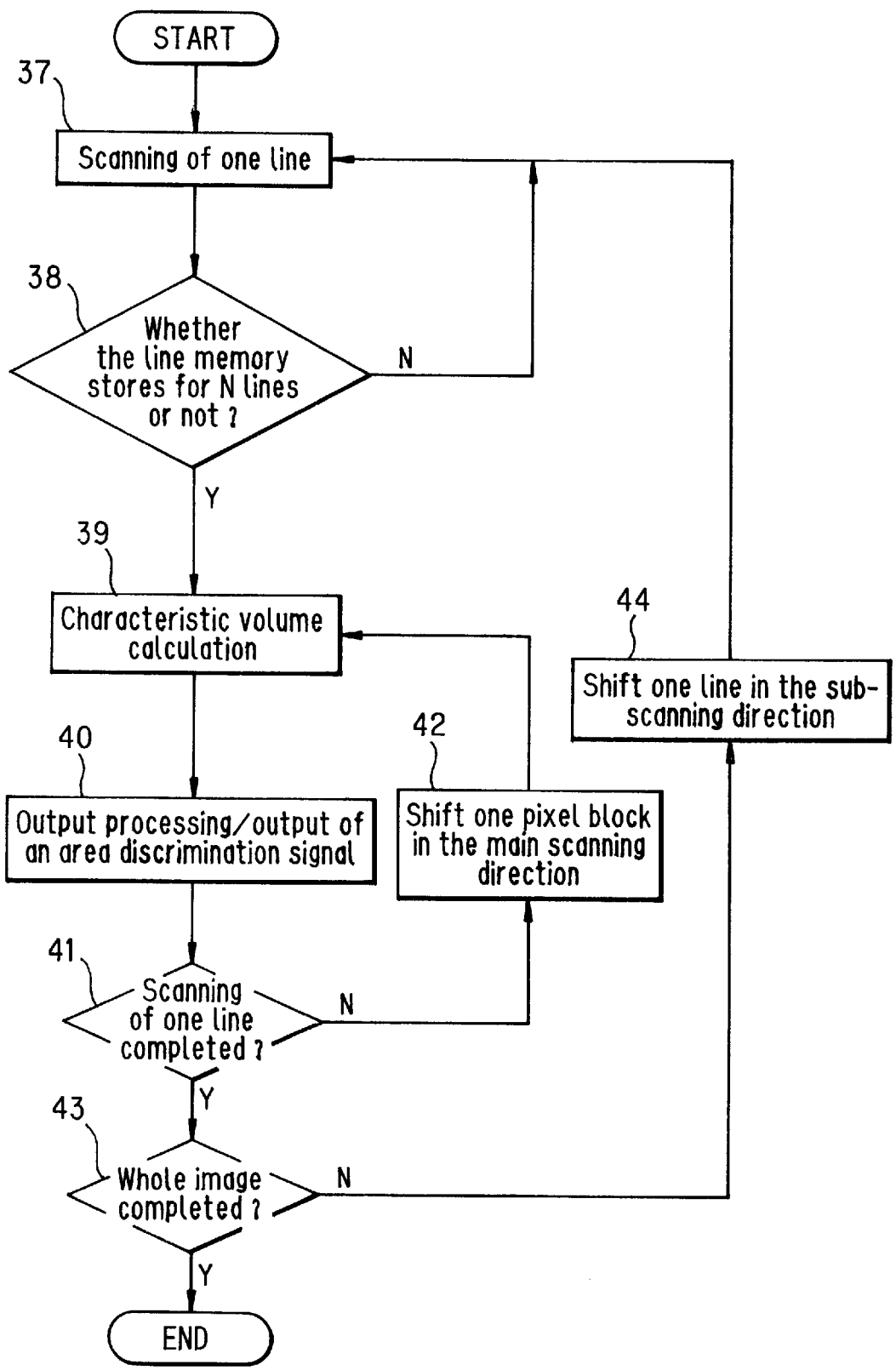
FIG. 10 is a flow chart of the processing of an image processing apparatus shown in FIG. 1.

FIG. 10 is a flow chart for a general processing of the image processing apparatus according to the present embodiment.

First, one line in the original document is scanned in the main scanning direction (Step 37), then it is judged whether image signals are held in line memories for N lines or not, to obtain an image signal of a local block. If image signals are not held for N lines, return to Step 37, and similar processing is repeated by shifting the scanning spot in the sub-scanning direction (Step 38).

A characteristic volume is calculated from the image signal of the local block to obtain a discrimination result for every target pixel (Step 39), and the discrimination result is output or a discrimination signal is output (Step 40).

Then, it is judged whether scanning of one line has been completed or not (Step 41), and if it has not been completed, the processing of Step 39 and Step 40 is repeated by shifting a local block in the main scanning direction (Step 42).

If scanning of one line has been completed at Step 39, it is judged whether processing of the whole image has been completed or not (Step 43), and if it has not been completed, return to Step 37, and similar processing is repeated by shifting the line in the sub-scanning direction (Step 44).

The processing flow in the local characteristic value-computing means 4 at Step 39 will now be described with reference to FIG. 11 to FIG. 13.

Figure 11:
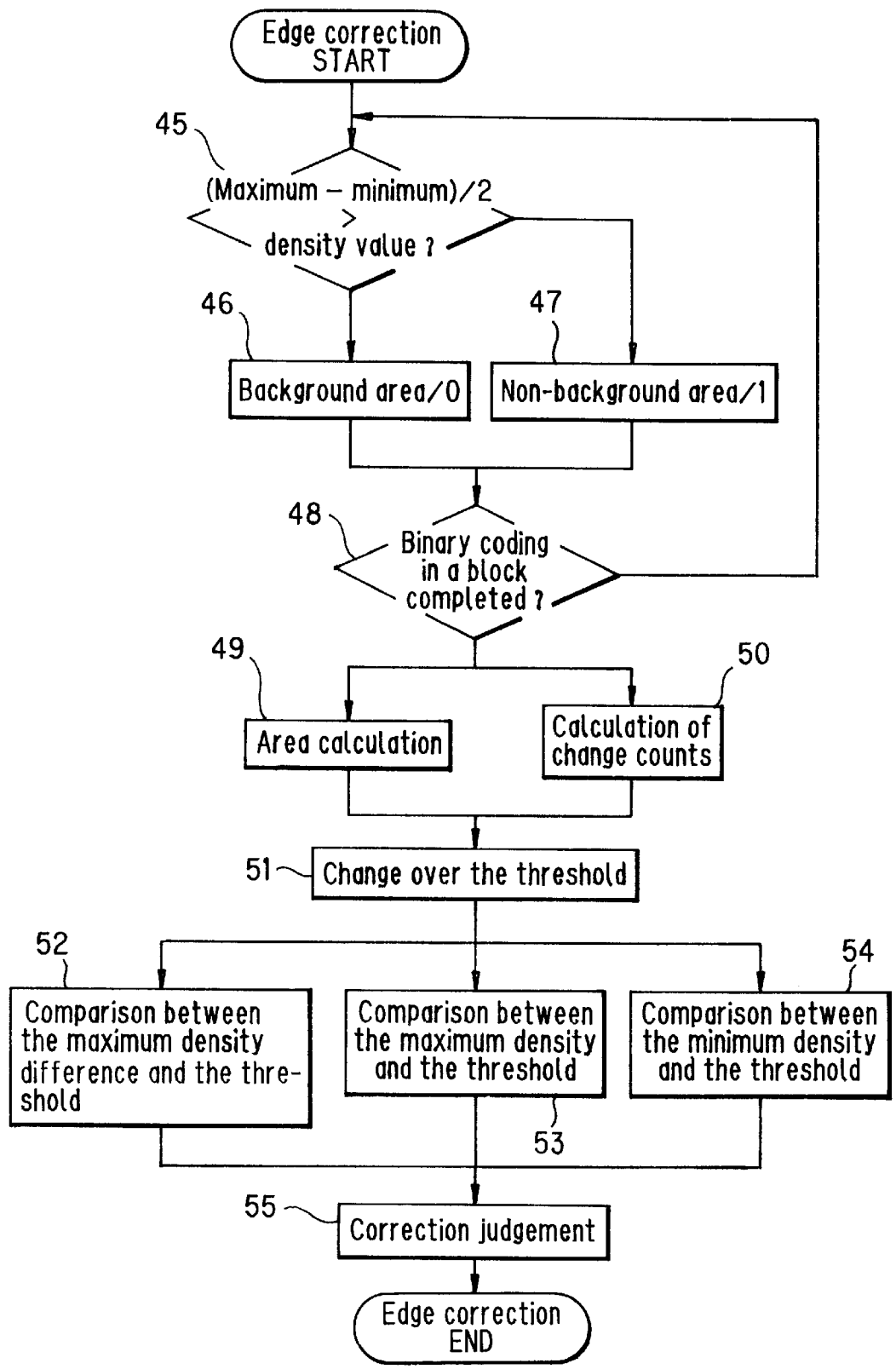
FIG. 11 is a flow chart of the processing of an edge correction processing block 8 shown in FIG. 3.

FIG. 11 shows a flow chart of the edge correction processing block 8.

In the edge correction processing, an average density value obtained from the maximum density value and the minimum density value in a local block is first compared with a predetermined threshold (Step 45). Then, binary coding processing is performed to divide a block into two areas, that is, when the average density value is smaller than the predetermined threshold, it is designated as a background area (0), and when the average density value is larger than the predetermined threshold, it is designated as a non-background area (1) (Steps 46 and 47). This binary coding processing is performed for all local blocks (Step 48), to perform calculation of each area (dimension) of the background area (0) and the non-background area (1) in the local block (Step 49), and calculation of the change count (Step 50).

Based on these two parameters (the area calculation value and the change count), respective thresholds of the maximum density difference, the maximum density and the minimum density in a local block, which are judgement parameters for judging whether the local block is a character area or not are changed over (Step 51).

The respective thresholds determined in Step 51 and the maximum density difference, the maximum density and the minimum density in the local block are compared (Steps 52, 53 and 54), to judge whether the local block is a character area or not based on the threshold processing results, and to judge the necessity of the edge correction judgement (Step 55).

Figure 12:
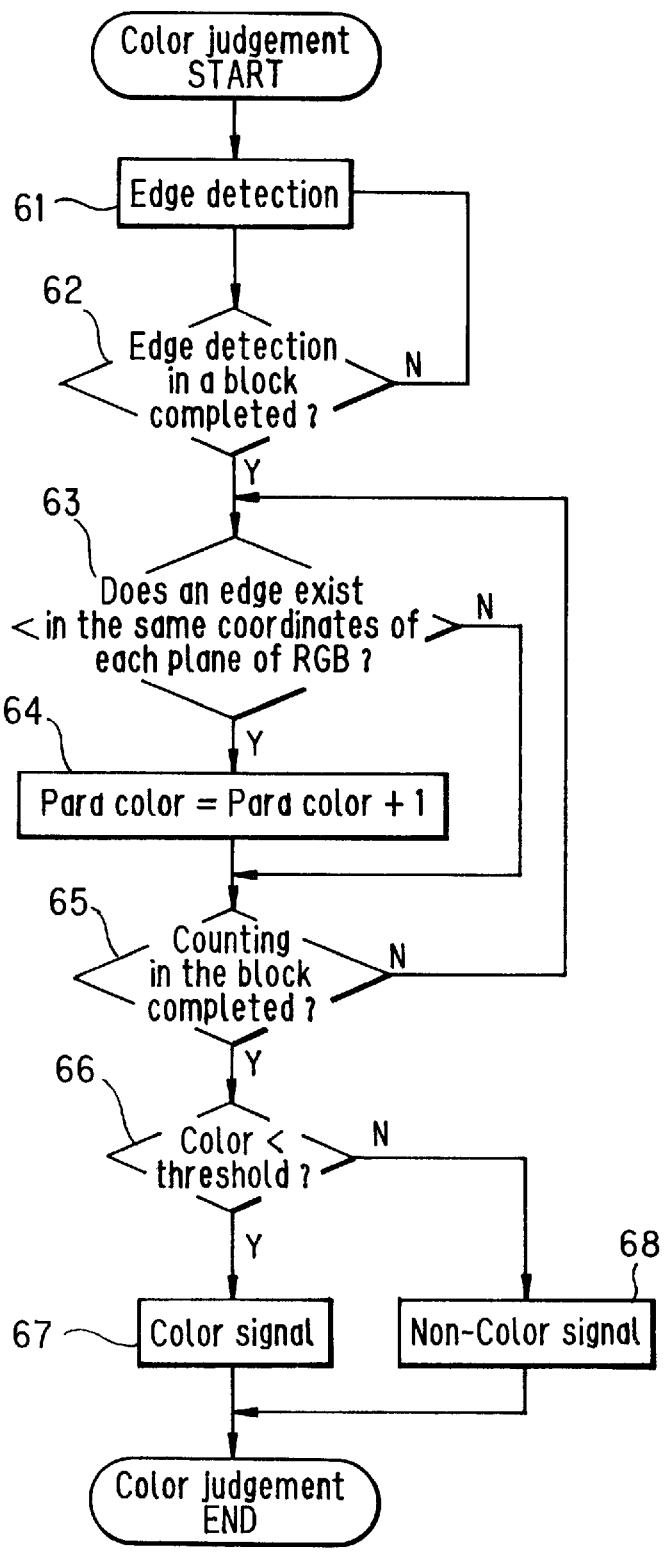
FIG. 12 is a flow chart of the processing of a color judgement processing block 9 shown in FIG. 3.

FIG. 12 shows a flow chart of the color judgement processing block 9.

First, an edge in a local block is detected (Step 61), and after all edges in the local block have been detected (Step 62), proceed to the next Step 63.

In Step 63, it is judged whether an edge in each plane of R, G and B exists in the same coordinates, with respect to the edge detection results obtained in the whole process, and if an edge exists, a parameter for color judgement (Paracolor) is incremented (Step 64), to determine a parameter (Paracolor) in the local block (Step 65). Then, in Step 66, the number of parameters (Paracolor) is compared with a predetermined threshold. When the number is not larger than the predetermined threshold, the edge is designated as a color letter edge and a color letter signal is output (Step 67), and when the number is larger than the predetermined threshold, a non-color letter signal is output (Step 68).

Figure 13:
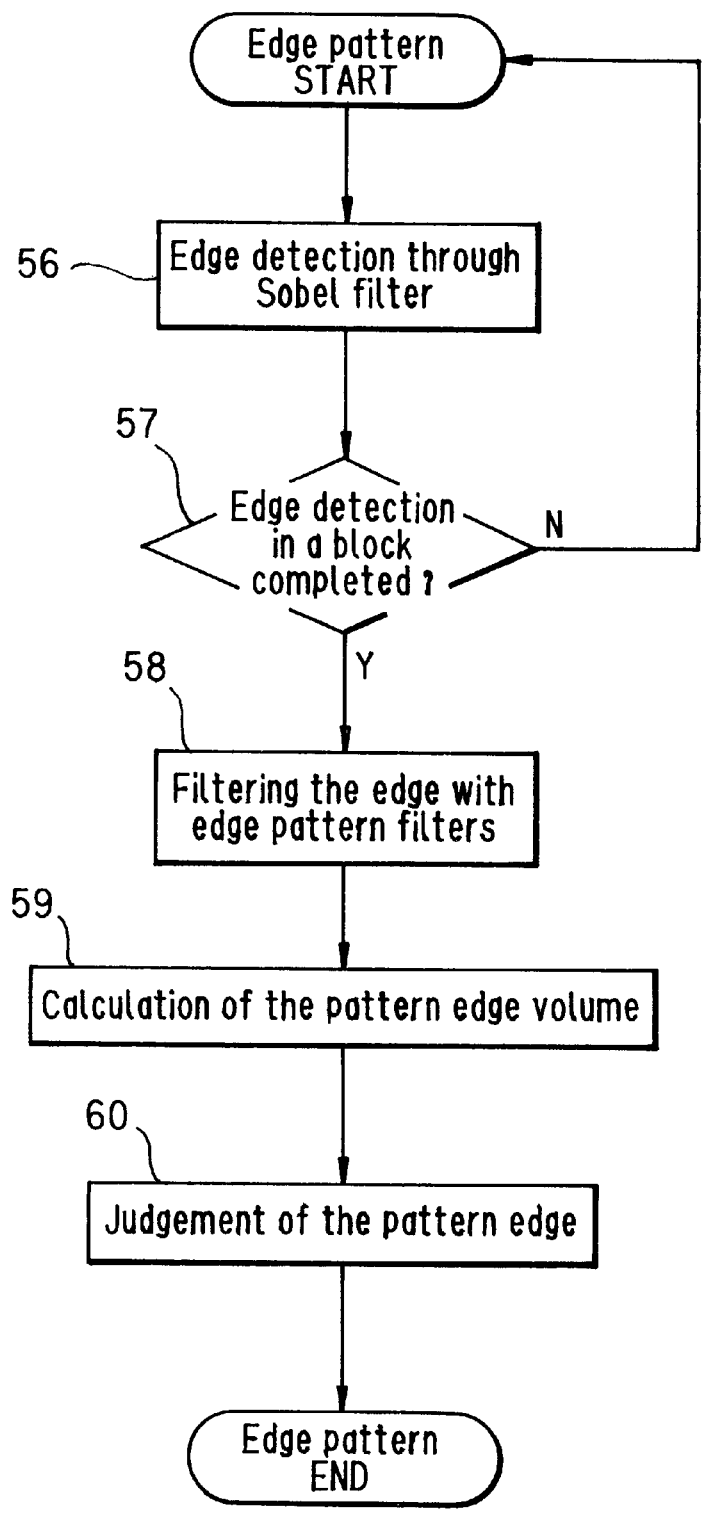
FIG. 13 is a flow chart of the processing of an edge pattern detection processing block 10 shown in FIG. 3.

FIG. 13 shows a flow chart of the edge pattern detection processing block 10.

First, an edge in a local block is detected by the Zoebel filter (Step 56), and after completion of the edge detection in the local block (Step 57), the edge is filtered through an edge pattern filters 32–35 (FIG. 9) (Step 58) to obtain a pattern edge volume by each filter (Step 59). When the largest pattern edge volume among them satisfies a predetermined threshold, it is determined to be a character edge (Step 60).

According to the edge correction processing block 8 of the above described embodiment, when the maximum density R5 difference, the maximum density value and the minimum density value in a local block, used for the detection of a black letter, are processed with the thresholds to detect a character edge, it becomes possible to maintain the sufficient detection accuracy for not only large letters but also for small letters, which are generally considered to be difficult to be detected, not by using a fixed threshold as a threshold for the threshold processing, but by properly changing over the threshold according to the situation of the local block.

According to the color judgement processing block 9, by performing the processing in the color judgement processing section 18, based on the detection results of the edge detection 17 in each plane of RGB, it becomes possible to judge whether the character edge is that of a black letter or that of a color letter.

According to the edge pattern detection processing block 10, since it can be reliably judged whether the edge arrangement is that of a character edge or not by the edge arrangement detection section 19, erroneous discrimination can be eliminated even in a case where the density changes gently, such as in a continuous tone area, which may be erroneously judged if only the binary coding processing is performed.

Therefore, according to the image processing apparatus of the present embodiment, an image processing apparatus can produce a high quality image, even when large letters and small letters mingle in an original document, and spaces between letters are narrow, or color letters are included, by properly discriminating these letters and performing emphasizing processing suitable for these letters.

Moreover, according to the image processing apparatus of the present embodiment, binary data after binary coding processing of a local block is used as a parameter for changing over the threshold, hence a very simple construction becomes possible when an image processing apparatus is actually designed.

Furthermore, according to the image processing apparatus of the present embodiment, it is possible to utilize an edge used in the edge arrangement detection section 19, for performing the color judgement processing based on the detection result of the edge detection section 17 for each plane of RGB, hence the size of a memory for the color judgement section 18 and the size of a circuit can be made small.

In the above described embodiment, a preferred embodiment of the present invention has been described, but it is a matter of course that the present invention is not limited thereto.

For example, a case where a threshold A and a threshold B are set as the threshold of the maximum density difference has been explained for the sake of convenience, but the threshold may be a value functionally determined with respect to parameters of an area value and the like, and the threshold is not limited thereto. The same thing can be said for the maximum density value and the minimum density value.

Moreover, with regard to the local characteristic value-computing section 4, the description has been made for a case where all the edge correction processing block 8, the color judgement processing block 9 and the edge pattern detection processing block 10 are used. However, by selectively using either of them depending upon the contents to be processed, the image processing apparatus can be made small, the processing speed can be improved, and the production cost can be reduced, while exerting the effect of the processing block to be used.

Furthermore, the above described numerical equation and the like are not restrictive, and preferably, judgement conditions such as whether a threshold is included or not n in the threshold processing is properly selected, by setting a threshold depending upon the property of the image signal.

As described above, according to the construction of the first gist, when edges of, for example, black letters are detected by processing the characteristic information in the predetermined block used at the time of detection of black letters and the like with the threshold, it becomes possible to maintain the detection accuracy not only for large letters but also for small letters, which are generally considered to be difficult to be detected, not by using a fixed threshold as a threshold for the threshold processing, but by properly changing over the threshold according to the area (dimension) of the predetermined area after binary coding and the number of times that the binary values are changed.

In particular, by utilizing a fact that small letters and fine letters have an area (dimension) different from that of large letters in a predetermined block, a binary area after binary coding is used for changing over the threshold. When the area is small, the threshold of the characteristic information is set to be wide, enabling to correspond to small letters and fine letters, thereby the detection accuracy of small letters and fine letters can be increased compared to the detection accuracy when using a fixed threshold of the characteristic information.

Moreover, when, for example, a small letter is close to other letters, it may be judged as a wide area. In that case, however, since the number of times that the binary values are changed is larger than a predetermined number, by including such a change count in a parameter for determining the threshold of the characteristic information, letters can be properly detected even where small letters are formed densely.

According to the construction of the second gist, by properly changing over the threshold used for the threshold processing for the characteristic information, depending upon the area (dimension) after binary coding of the predetermined block and the number of times that the binary values are changed, sufficient detection accuracy can be maintained not only for large letters but also for small letters which are generally considered to be difficult to be detected, as well as differentiation between monochrome letters and color letters becomes possible. Hence, emphasizing processing suitable for the monochrome letters and color letters can be performed properly, thereby an image processing apparatus which can produce a high quality image can be provided.

According to the construction of the third gist, by properly changing over the threshold used for the threshold processing of the characteristic information, depending upon the area (dimension) after binary coding of the predetermined area and the number of times that the binary values are changed, sufficient detection accuracy can be maintained not only for large letters but also for small letters which are generally considered to be difficult to be detected, as well as the character edge can be discriminated based on the edge arrangement. Hence, the character edge can be reliably discriminated.

Since characters can be emphasized in the area where it is judged to be a character area, an image processing apparatus which can produce clear and vivid black letters can be provided.

What is claimed is:

1. An image processing apparatus which discriminates an area having different properties with respect to an image signal obtained by scanning an original document, and performs adequate processing to each area, wherein said image processing apparatus comprises:
dividing means for dividing the image signal into local blocks having a predetermined size; and
local characteristic value-computing means having:
a binary coding processing section which converts an image signal in a predetermined block including a target pixel into binary code information, from image signals output from the dividing means in an area to be processed;
a threshold processing section which processes characteristic information in the predetermined block with a threshold determined by selectively using each area (dimension) value of binary values from the binary code information output from the binary coding processing section and number of times that the binary code information is changed; and
a judgement processing section which judges whether the target pixel in the predetermined block is a character area or not based on the processing result of the threshold processing section.

2. An image processing apparatus which discriminates an area having different properties with respect to an image signal obtained by scanning an original document, and performs adequate processing to each area, wherein said image processing apparatus comprises:
dividing means for dividing the image signal into local blocks having a predetermined size; and
local characteristic value-computing means having:
an edge detection section for detecting an edge in a local block including a target pixel in the local block output from the dividing means;
a binary coding processing section which converts an image signal in a predetermined block including the target pixel into binary code information, from image signals output from the dividing means in an area to be processed; a threshold processing section which processes characteristic information in the predetermined block with a threshold determined by selectively using each area (dimension) value of binary values from the binary code information output from the binary coding processing section and number of times that the binary code information changed; and a judgement processing section which judges whether the target pixel is a character area or not based on the processing result of the threshold processing section; and
a color judgement processing section for judging whether the target pixel which is an edge is a monochrome edge or a color edge, based on the edge detection results of the edge detection section.

3. An image processing apparatus which discriminates an area having different properties with respect to an image signal obtained by scanning an original document, and performs adequate processing to each area, wherein said image processing apparatus comprises:
dividing means for dividing the image signal into local blocks having a predetermined size; and
local characteristic value-computing means having:
an edge detection section for detecting an edge in a predetermined block including a target pixel in the predetermined block output from the dividing means;
a binary coding processing section which converts an image signal in a predetermined block including the target pixel into binary code information, from image signals output from the dividing means in an area to be processed; a threshold processing section which processes characteristic information in the predetermined block with a threshold determined by selectively using each area (dimension) value of binary values from the binary code information output from the binary coding processing section and number of times that the binary code information is changed; and a judgement processing section which judges whether the target pixel is a character area or not based on the processing result of the threshold processing section; and
an edge arrangement judging section for judging the edge arrangement in the predetermined block including the target pixel, based on the edge detection result of the edge detection section.

* * * * *